United States Patent [19]

Hartman et al.

[11] Patent Number: 5,822,736

[45] Date of Patent: Oct. 13, 1998

[54] VARIABLE MARGIN PRICING SYSTEM

[75] Inventors: David J. Hartman, Rochester; Frank Lewandowski, Minnetonka, both of Minn.

[73] Assignee: United Hardware Distributing Company, Plymouth, Minn.

[21] Appl. No.: 395,313

[22] Filed: Feb. 28, 1995

[51] Int. Cl.$^6$ .................................................. G06F 151/00
[52] U.S. Cl. .................................................. 705/1; 705/14
[58] Field of Search .............................. 364/401, 406, 364/408; 395/201, 214, 216, 222

[56] References Cited

U.S. PATENT DOCUMENTS

| | | | |
|---|---|---|---|
| 4,563,739 | 1/1986 | Gerpheide et al. | 395/228 |
| 5,056,792 | 10/1991 | Helweg-Larsen et al. | 434/107 |
| 5,172,314 | 12/1992 | Poland et al. | 340/825.35 |
| 5,245,533 | 9/1993 | Marshall | 395/210 |

OTHER PUBLICATIONS

Smith et al., "Financial analysis for profit–driven pricing", Sloan Management Review, v35, n3, p. 71(14), Dialog file 14, Acc. No. 07278370.

Pitt, "Prices hang in the balance", Packaging in the balance, Packaging Week, v12, n2, p. 22(2), May 16, 1996, Dialog file 14, Acc. No. 08901395.

Sethuraman et al., "An analysis of the tradeoff between advertising and price discounting", Journal of Marketing Research, v28, n2, p. 160(15), May 1991, Dialog file 148, Acc. No. 051180729.

Hoch et al., "What do private labels succeed?", Sloan Management Review, v34n4 pp.:57–67 Summer 1993, Dialog file 15, Acc. No. 00741266.

Minkoff, "New tricks in pet supplies", Discount Merchandiser, v34n12 pp.:70–72, Dec. 1994, Dialog file 15, Acc. No. 00948901.

Christman, "Majors irked by retailers' markups on developing titles", Billboard, v105, n46, p. 1(2), Dialog file 148, Acc. No. 06757944.

Ilan, "Evaluation of Innovative Progjects–An Integrative Approach", Journal: IEEE Transactions on Engineering Management vol. 36, No. 1, pp. 51–54, Feb. 1989 Dialog file 2, Acc. No. 03375758.

Cory, "Variable Pricing: Making the Ups and Downs Add Up . . . ", Chilton's Hardware Age, V229, N9, P66(7)., Sep. 1992, Dialog file 148, Acc. 06158436.

Russell, "Pricing Accessories", Boating Industry, V56, N3, P45(1), Mar. 1993, Dialog File 148, Acc. No. 06505516.

"Pricing for Success", Hardware Age, Jan. 1989, V.226 No. 1 pp. 43–46, Dialog File 570, Acc. No. 0304562.

Gruner, "A System for Pricing . . . ", Restaurant Business, V86, N17, P151(4), Nov. 20, 1987, Dialog File 148, Acc. No. 03323309.

"Getting with the program saves members time, money", National Home Center News, Sep. 28, 1992, v.0, no 0, p. 20, Dialog file 570, Acc. No. 00595521.

*Primary Examiner*—Gail O. Hayes
*Assistant Examiner*—Frantzy Poinvil
*Attorney, Agent, or Firm*—Merchant, Gould, Smith, Edell, Welter and Schmidt, P.A.

[57] ABSTRACT

A variable margin pricing system and method that generates retail prices based on customer price sensitivity. Products are grouped into pools from a first pool for most price sensitive products to a last pool for least price sensitive products. A logical relationship between margins and the customer price sensitivity is determined for the products. Based on this logical relationship and each product's pool assignment, the system and method calculate each product's margin and corresponding retail price. The method is also used to generate retail price labels having retail prices based on customer price sensitivity for the products to which the labels are to be affixed or located proximate.

7 Claims, 10 Drawing Sheets

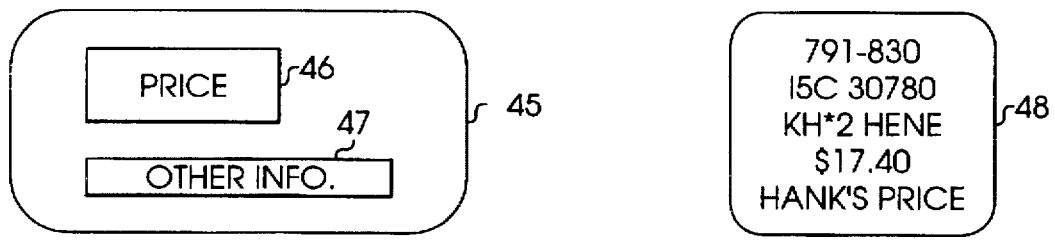
Fig. 6A                                    Fig. 6B
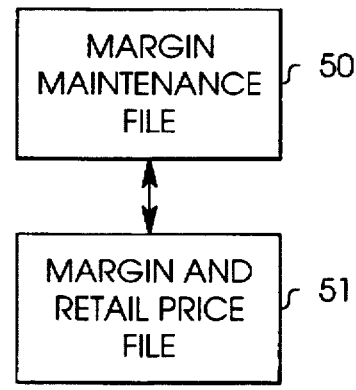
Fig. 7

CUSTOM PRICING SELECTION MENU

| | | | |
|---|---|---|---|
| 01 | CUSTOM PRICING INQUIRY | 02 | FINE LINE CLASS MAINTENANCE |
| 03 | FINE LINE CLASS ITEM MAINT. | 04 | FINE LINE CLASS DESC. MAINT. |
| 05 | FLC ITEM ENTIRE STORE DELETES | 06 | CUSTOM PRICING RETAIL INQUIRIES |
| 07 | FLC ENTIRE STORE DELETES | 08 | PRICING MATRIX MAINTENANCE |
| 09 | V.A.M.P.S. ITEM CLASSIFICATION | 10 | V.A.M.P.S. MARGIN MAINTENANCE |
| 11 | | 12 | |
| 13 | | 14 | |
| 15 | | 16 | |
| 17 | | 18 | |

OPTION DESIRED     USER ID     PASSWORD

PLEASE ENTER A PROGRAM SELECTION
ENTER - CONTINUE    CLEAR - MAIN MENU

*Fig. 8*

V.A.M.P.S. MARGIN MAINTENANCE
STORE NUMBER 789-8
DEPARTMENT 2

| CLASSIFICATION CODE | MARGIN AT $1 | MARGIN CHANGE COEFFICIENT | ADD MARGIN | MIN MARGIN | MAX MARGIN |
|---|---|---|---|---|---|
| A | .30 | .07 | 1.00 | .10 | .40 |
| B | .46 | .14 | 1.00 | .15 | .60 |
| C | .54 | .14 | 1.00 | .20 | .80 |
| D | .60 | .14 | 1.00 | .35 | .85 |
| E | .66 | .14 | 1.00 | .45 | .90 |
| X | .00 | .00 | 1.00 | .00 | .10 |

THE MARGINS WERE CHANGED ON THE VAMPS CLASS MARGIN RECORD.

ENTER - CONTINUE    PF2 - INQUIRY    PF4 - REFRESH    CLEAR - MENU

*Fig. 9*

```
CUSTOM PRICING RETAIL INQUIRIES

STORE NUMBER    789-8           HARDWARE HANK
                                ROCHESTER   MN 55902

ITEM NUMBER     520-395 31620   6IN T-HANDLE HEX KEY 5/16W         CLASS
                                                                   23600
    RETAIL PRICING
    STORE RETAIL    $3.99           LANDED COST     $2.63
         RETAIL     $.00            GROSS PROFIT    53.0%
    HANKS           $4.89           UNITED LIST     $4.60
    REGULAR         .00
    ASSORTMENT      .00             UNITS OF MEASURE
    LARGE           .00                 ORDER       EA
    ITEM MULT       2.42924             RETAIL      EA
    CLASS MULT                          BILLING

THIS ITEM HAS ITEM CUSTOM PRICING.
PLEASE ENTER STORE AND ITEM NUMBERS.
PF2 - INQUIRY    PF4 - REFRESH    CLEAR - MENU
```

*Fig. 10*

VAMPS CLASSIFICATION CODE
MAINTENANCE
STORE NUMBER 789-8
CLASS NUMBER 23600
ITEM NUMBER 520-395
CLASSIFICATION CODE D
RETAIL .00

THE CLASS CODE AND/OR RETAIL WERE CHANGED ON THE FINE LINE CLASS ITEM RECORD.

ENTER - CONTINUE    PF2 - INQUIRY    PF4 - REFRESH    CLEAR - MENU

*Fig. 11*

VARIABLE MARGIN PRICING SYSTEM

FIELD OF THE INVENTION

The present invention relates to an apparatus and method for generating retail prices of products, and more particularly to variable margin pricing of products.

BACKGROUND OF THE INVENTION

Many years ago dealers typically had a constant margin on every SKU in stock. Some merchants had been increasing their margins by a few percent to account for larger freight bills or to increase net profit. As the flood of big discounters and other large inventory warehouse-type stores began to change the market, dealers of smaller stores reacted by reducing those flat store margins and found that it only significantly reduced their profit margins. Even with a reduced constant margin, the high end prices were still too high. The discounters had created their image by using very low margins on higher priced merchandise and recovered margin on the low priced stock keeping units (SKUs).

In recent years, trade journals have discussed highly sensitive prices on a few dozen SKUs. The believers of this theory state that the public has memorized the price of the leader SKUs found in the big discounters, and other stores must match these prices or be subject to "bad price image." As a result, the small store dealers have attempted to guess what those highly-sensitive SKUs are and have changed them individually on their products over and over again, depending on trade circulars and customer complaints.

Trade journals also discuss a philosophy that gross profit margins should decline as prices increase. These journals, however, do not elaborate on how to accomplish this on a typical inventory of 15,000 SKUs. Apparently, the journals discussing this philosophy believe that prices can be changed one at a time and then maintained.

Many dealers have attempted the above theories and found that they could not keep the typical systems offered by wholesalers under control. A perfectly set up system to manage prices according to these theories would slowly "slide away" from manageable pricing, because there was no underlying logic in the system to correct for the unavoidable changes in products and competition. Many of these pricing systems, for example, simply use the computer as a large electronic filing cabinet which does nothing more than store millions of little individual decisions regarding each retail price. These systems do not have the unifying thread of mathematics and logic that makes it possible to answer the question: where do retail prices come from or, more particularly, how are they logically related to customers' purchasing decisions?

These existing systems become complicated and unmanageable for small independent dealers who wish to take significant control over their own prices. They have no option except to individually price their entire inventory. Since there are inevitable changes in the merchandise, the dealers are forced into spending a large portion of their time in system maintenance due to the required individual adjustment of prices. The dealer is forced to make the same decisions over and over again in a never ending cycle. The dealers are manually attempting to adjust prices, instead of using the computer to determine a logical relationship between price and customers' purchasing decisions and automate the calculation of retail prices.

SUMMARY OF THE INVENTION

This invention is a variable margin pricing system and method that generates retail prices based on price sensitivity and cost. This method allows dealers more flexibility and a simple direct control over the retail pricing of the products. The system and method involve receiving electronic information identifying a plurality of products and electronic product cost information including a cost for each of the products. Customer price sensitivity, and a logical relationship between gross profit margins and the customer price sensitivity, is determined for the products. The method and system electronically assign varying margins to the products based on the logical relationship between margins and the customer price sensitivity for each of the products. Retail prices for each of the products are then electronically generated, as determined by the cost information and the assigned margins for each of the corresponding products. In an alternate embodiment, the present invention generates retail price labels having retail prices based on customer price sensitivity and cost for the products to which the labels are to be affixed or located proximate.

BRIEF DESCRIPTION OF THE DRAWINGS

FIG. 6A is a diagram of a generic retail price label or ticket.

FIG. 6B is a diagram of an example of a retail price label or ticket.

FIG. 7 is a diagram of files within a computer system for a variable margin pricing system.

FIG. 8 is a diagram of a menu user interface for a variable margin pricing system.

FIG. 9 is a diagram of a margin maintenance user interface for a variable margin pricing system.

FIG. 10 is a diagram of a custom pricing retail inquiries user interface for a variable margin pricing system.

FIG. 11 is a diagram of a classification code maintenance user interface for a variable margin pricing system.

DETAILED DESCRIPTION

Overview

A radically different approach has been taken with the present invention where the basic philosophy is that retail prices only need to be close to a vague undefined target. To implement this concept dealers usually first review their entire inventory and assign the SKUs to pools which indicate the dealer's feel as to the degree of the customers' sensitivity to retail prices. Then a computer, operating under software control, generates the retail prices for the dealer's inventory based on the sensitivity assignments and the gross profit the dealer believes the business can reasonably attain. The dealer then controls margins and retail prices by modifying the numerical values (coefficients) associated with the dealer's decisions. The dealer can adjust the bottom line gross margin to keep the business viable and need not be concerned with determining exact retail prices because in reality they do not exist.

The basic logic of the system is that the customers' retail price sensitivity increases as the magnitude of the dollar value of the transaction increases and this increasing sensitivity must be offset with a corresponding decrease of gross profit margin. For at least 80% of the SKUs in a hardware store, for example, this type of customer sensitivity has not been contaminated by the continual battle between "big box stores" (discounters) vying for their own price images. A variable margin pricing system concentrates on this 80% of the inventory by smoothly neutralizing the customers' increasing sensitivity to increasing levels of retail prices and then in the remaining 20% forces the users of the system to recognize that their major competitors (discounters) have permanently imprinted into customers' consciousness certain SKUs that must be retailed at lower margins. The dealer should regard the very low margin SKUs as part of the advertising budget, since the dealer obtains little or no return from the retail price. Finally in this last 20% a variable margin pricing system also gives the dealer the opportunity to increase the gross margins on the SKUs where the dealer has a market niche.

Figure 1:
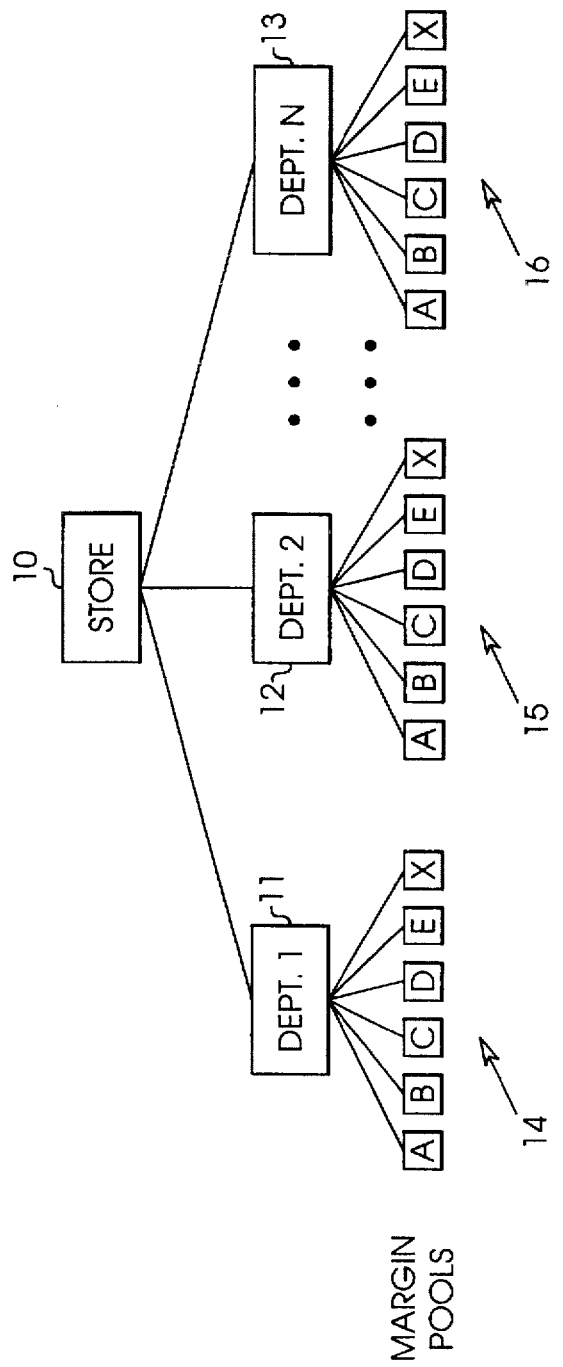
FIG. 1 is a diagram of the organization of items or products by department and pools within a retail store in order to perform variable margin pricing of the items.

FIG. 1 illustrates how a store's products may be divided for pricing according to the above principles. A store 10 typically has products divided into a plurality of departments 11–13. For example, a hardware store may have departments as shown in Table 4. For use with the present invention, a dealer or store operator divides each departments into pools A–X, such as the plurality of pools 14–16 for departments 11–13. Products are organized into these pools with pool X containing the most price sensitive products to pool E containing the least price sensitive products. Pool C is the standard pool for SKUs with nominal (low) price sensitivity.

Figure 2:
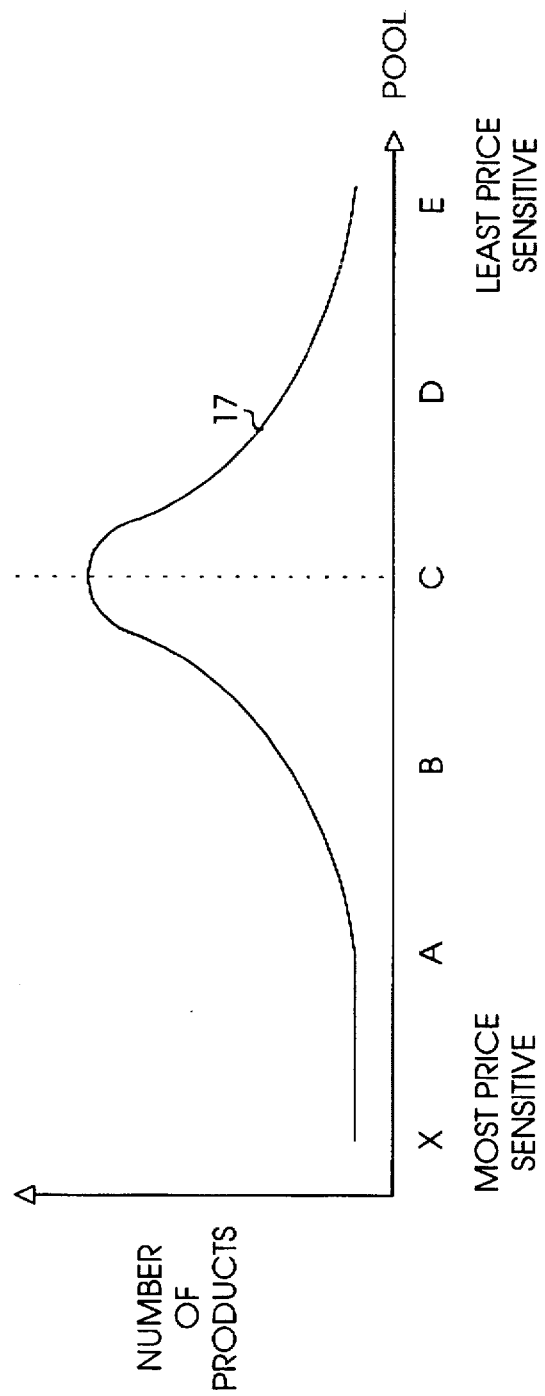
FIG. 2 is a graph of an example of a distribution of items by product pool.

FIG. 2 is a graph of a typical product distribution among the pools. The graph usually resembles a bell curve centered at pool C, since most products fall within this category. While only five pools are shown for price sensitivity, additional or fewer pools can be used. Adding more pools tends to primarily affect the ends of the curve by expanding the curve in the direction of the x-axis. Therefore, more pools tends to mainly further divide the categories at the ends of the curve. Since the categories at the ends of the curve, such as X and E, typically do not contain many products anyway, more than six pools usually does not result in significant benefits.

Once dealers have made all the above decisions they have created an encompassing set of logic that all of their SKUs can be screened through to establish the SKUs approximate retail values. The dealers can then fine tune the system adjustments based on their local business environment and financial goals.

A variable margin pricing system is designed to give the small independent dealer (for the first time ever) a simple and direct control of profit margins based on the SKU cost and its price sensitivity. If dealers so desire, this attention to reducing margins with increasing cost should help the dealers in recovering some of their price image when compared to the big discounters. A variable margin pricing system can be used by any sized business for managing and pricing products based on customer sensitivity.

The dealers also obtain a simple direct control of their gross profit dollars which they can adjust as they review the store's financial performance. The variable margin pricing system is thus a management tool that provides a dealer with direct control over gross profit dollars and a method of responding to external pressures from large discounters or other competitors. The dealers should also have continuing market studies to update their sensitive items files (pools) and a business plan that details their methodology in coexisting with the "big box" stores.

VAMPS System Design Objectives

A typically standard 80% of SKUs (pool C relatively non-sensitive items) needed a basic mathematical concept for variable margin adjustment. A comfortable markup at many SKU costs from $0.01 to $100.00 was determined by a group of experienced dealers. A mathematical relationship was found based on these markups which could fill in all the blanks between these cost points using a computer. The computer is not simply an electronic filing cabinet, it is generating retail prices based on a logical and mathematical relationship between customer price sensitivity and margins.

The system is designed to generate retail prices reasonably close to what major competition, for example, is doing with sensitive items and to increase margins for less sensitive items. This provides the dealers with sufficient control over the individual prices and a very good control over the things that make their businesses viable. The dealers can adjust the bottom line margin in any department to any level they wish by changing pricing parameters. If the dealer finds, for example, that a certain SKU is too high or low they can move it to another pool of appropriate price sensitivity. A variable margin pricing system is designed to maximize the total gross profit return while creating an acceptable price image.

Product Pool Assignments

A number of SKUs do not fit the standard definition of price sensitivity used in pool C. These SKUs are preferably grouped so that they do not have to be individually priced. This leads to the assembling of these SKUs of similar sensitivities into groups, which results in a margin pool concept. There is no such thing as a correct retail price, they only need to be reasonably close to the competition or to some other rule that the dealer has established.

The following is an example of logic for forming the other margin pools which are used in conjunction with pool C and how the margins for those pools may be mathematically related to a pool C margin.

Pool X. This pool contains the SKUs that are typically significantly promoted by competitors and have a usual retail at or below cost. This pool is generally for image protection only and is, therefore, part of the advertising budget. The dealer sets this margin (+ or −10% is a probable setting). Once these SKUs have been identified, the dealers should be very careful in which ones they stock as they are sending an advertising message to the public and the SKUs should build the desired image. Since these SKUs are at "everyday give-away" pricing, the danger is that the customer will simply come to accept the situation as status quo. Dealers receive no customer goodwill on these SKUs unless they use special high visibility "flags" to accent the fact that these are specially priced goods. For instance, the dealer can use high visibility retail tickets or labels for this pool.

Pool A. This pool has SKUs that are highly price sensitive but not as price sensitive as those of pool X. The margin for pool A may be, for example, 55% of the margin (M1C) of pool C. A typical hardware store, for example, may have perhaps 500 SKUs in this pool.

Pool B. This pool has SKUs that are somewhat individually sensitive and will not carry the standard margins. A typical store may have perhaps 1500 SKUs in this pool at margins of, for example, about 85% of the pool C margins.

Pool C. The standard margin pool C is based on the majority of a store's inventory which has no individual price sensitivity; for example, 70% to 80% of a typical hardware store's inventory. The only sensitivity is to the dollar value of the selling (retail) prices. A variable margin pricing system is designed to smoothly adjust the margin downward as the dealer cost of SKUs in this pool increases.

Pool D. This pool has SKUs which are usually not available at competitors. Therefore, pool D items can be priced at a higher margin than pool C items; for example, 11% more margin than pool C pricing.

Pool E. This pool has unique or special goods that are expensive to procure and, therefore, dealers should be paid for the effort in stocking these goods. This pool's margin may be, for example, 22% above pool C.

Pool F. Dealers have an option in this pool to price an SKU with any retail value they see fit. This pool is also used to price bulk SKUs and others which are sold in any number of divisions of the purchased quantities; for instance, rope or chicken wire in a hardware store.

Table 1 summarizes the mathematical and logical relationship between the pools for this example. This interrelating of the pools allows a dealer to change only one parameter (e.g. margin for pool C) and have prices in other pools change accordingly. Dealers or other users may also fine-tune the pool relationships shown in Table 1 or generate their own interrelationship of the pools. Alternatively, the pools can operate independent of one another.

TABLE 1

M1A % = 0.55M1C %
M1B % = 0.85M1C %
M1D % = 1.11M1C %
M1E % = 1.22M1C %

All of the above pools typically have minimum and maximum limits which set the extreme values for the variable margins of items in each pool. These limits may be used to set the boundaries of the useful range of the mathematical function, the reasonable range of allowable margins, and in certain departments to put an upper limit on the unusual cases where low end prices are sensitive.

A start-up variable margin pricing system may be used with a recommended set of pool assignments for every SKU in every department. This recommended pool may be developed by a group of experienced retailers for a particular product line who, because of their experience, have a good "feel" for the price sensitivity of items in the product line. Dealers who are just starting to use the variable margin pricing system can accept these recommendations or modify them to meet their own particular needs. Start-up dealers, for example, may run their past purchase history through a set of recommended pool assignments and then tailor them to the needs of their particular market. For instance, dealers may want to look especially for SKUs that will allow more margin than the standard pool C and adjust the pool assignments accordingly.

Once dealers have made any pool changes to set up their department, the dealers again may have their previous twelve months purchases, for example, run through their own specially set-up variable margin pricing system with a margin setting (pool C margin M1C) that will deliver the same gross profit as their earlier pricing system. The dealers can then make a final evaluation of a variable margin pricing system in their stores and adjust the margin up and down by changing the departmental M1C setting as they see fit.

Therefore, the present invention provides for allowing the dealers a parameter (M1C) to adjust their departmental gross profits to a level that fits their situation. When the dealers adjust the parameter every retail price in every pool in the selected department moves up or down in unison, as determined by the pool interrelationships. (Pool X and pool F do not change with the adjustment of this parameter.)

Variable Pricing Theory

As discussed above, variable margin pricing involves determining a logical relationship between margins and customer price sensitivity. This may be accomplished, for example, by first assembling a group of experienced dealers, making a table of cost points which covers usual range of SKUs for the dealers' product lines, and then assigning retail prices to the cost points that the dealers believe fit the definition of comfortable pricing for the standard pool C non-sensitive SKUs. Table 2 contains exemplary data for cost points and "comfortable" retail prices for hardware and related products.

TABLE 2

| Cost ($) | Retail Prices ($) |
|---|---|
| 0.01 | 0.05 |
| 0.05 | 0.17 |
| 0.10 | 0.30 |
| 0.20 | 0.50 |
| 0.50 | 1.15 |
| 1.00 | 2.10 |
| 5.00 | 8.75 |
| 10.00 | 16.50 |
| 50.00 | 70.00 |
| 100.00 | 130.00 |

Next, based on this data, one performs "curve fitting" in order to determine a mathematical expression for a curve 10 which would fit the relationship shown by the data in Table 2. A curve fit was found in the logarithmic family of mathematical relationships. The expression is a restatement of the typical margin equation [1].

$$\text{Retail} = \frac{\text{Cost}}{(1 - \text{Margin})} \quad [1]$$

Adding a new term which reduces the margin as cost increases in order to fit the data in Table 2 produces the mathematical relationship shown in equations [2] and [3].

$$\text{Retail} = \frac{\text{Cost}}{(1 - \text{Margin}) + (\text{Variable Margin Formula})} \quad [2]$$

or $$\text{Retail} = \frac{\text{Cost}}{(1 - M1) + K2\text{Log}(\text{Cost})} \quad [3]$$

The new denominator in equation [3] replaces the simple (1M) of the original margin expression (equation [1]).

In equation [3], K2=slope of margin adjustment. It has been found that a value of 0.14 is very good. This means that for every factor of ten increase in cost the margin decreases 14%. Note that when the cost is less than $1 (one dollar) the logarithmic term becomes negative and the retail prices are increased as costs decrease. This is a very good fit to hardware and related types of merchandise. Fitting the curve (equation [3]) to dealers' typical comfort-level prices as shown in Table 2 yields values for the equation constants as follows:

M1=52% margin at $1 SKU Cost
K2=0.14

These values for the parameters are not the only possible values providing a relationship between price sensitivity and margin. However, agreement has been found among dealers of hardware and related products on the comfort level prices which these parameters represent. It has also been found that the M1 setting in pool C usually ranges from about 0.5 to 0.6 for the typical departments in a hardware store.

One aspect of a variable margin pricing system is a controller. An example of a controller is shown in Table 4. This document lists all the coefficient settings necessary to control the retail prices of, for example, a hardware store's inventory. It provides dealers with a precise view of the structure of their retail pricing and access to the controls necessary to adjust retail prices according to variable margin pricing. As described above, the M1 settings of all the pools (except X or F) are usually interrelated by simple ratios driven by the setting of M1C (pool C). Thus every retail price in the entire department (not X or F) changes with M1C. This concept reduces a complicated set of interrelated values into something readily visualized and understood by dealers. For security purposes, a variable margin pricing system can be programmed such that nothing in the database can be assessed without entry through the controller, which restricts access only to authorized personnel.

Figure 3:
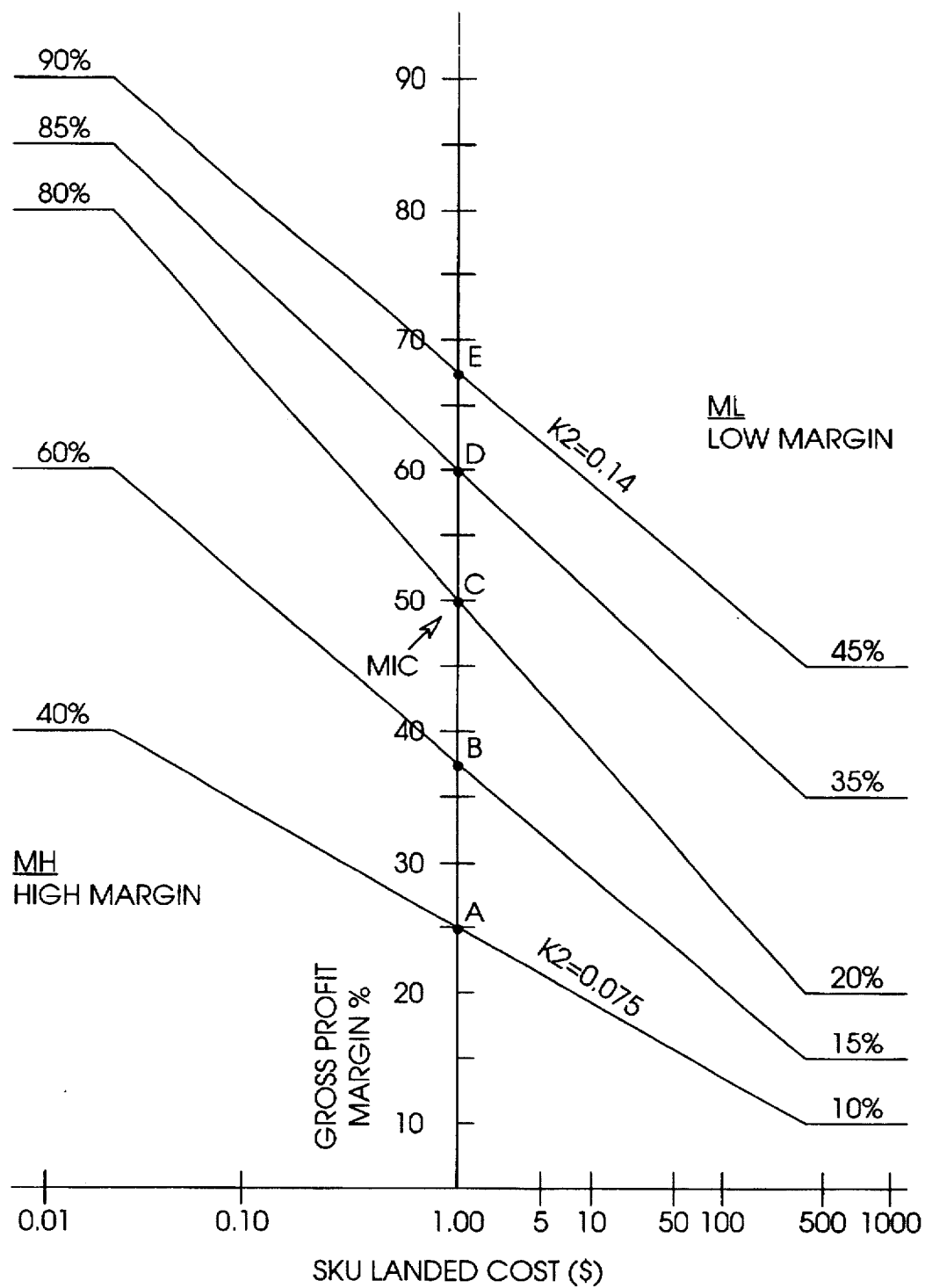
FIG. 3 is a graph of an example of a margin pool family for stock keeping units (SKUs) within one particular department of a store.

FIG. 3 is a graph of an example of a margin pool family for items within one particular department of a store. The vertical axis for margin percentage is located at $1.00 cost, because this cost is the reference value for pool margin assignments. If the pools are interrelated, as described above, then a dealer can adjust all prices for products in pools A-E by changing parameter M1C, which is the margin for pool C products at $1.00 cost. The graph in FIG. 3 also shows how margin increases from pools A-E as price sensitivity decreases (in the vertical direction from bottom to top), and how margin decreases within each pool as cost increases (in the horizontal direction from left to right). The "flat" portions at the ends of the graph represent minimum and maximum margins for each pool.

Variable Pricing System and Method

Figure 4:
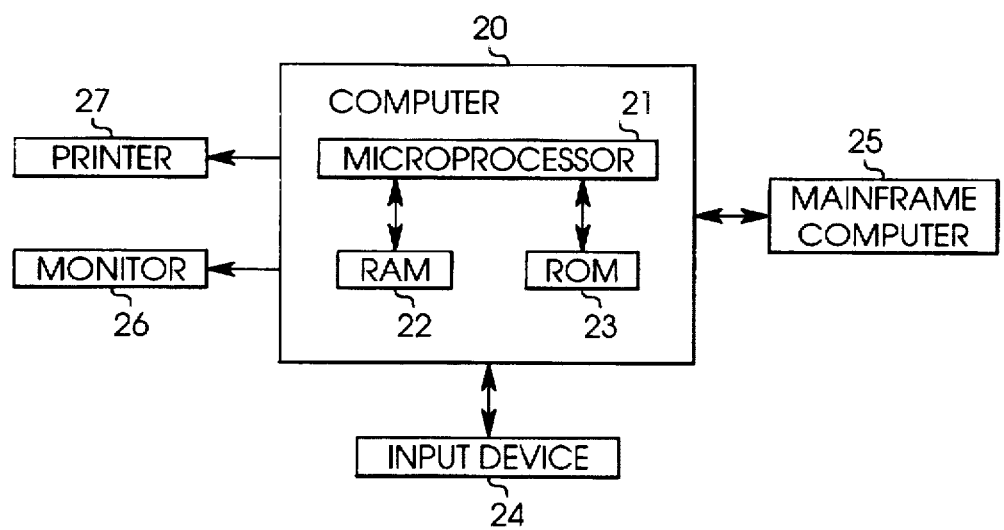
FIG. 4 is block diagram of an apparatus for implementing a variable margin pricing system ("VAMPS").

FIG. 4 is a block diagram of an apparatus for implementing a variable margin pricing system according to the principles of the present invention. The apparatus includes a computer 20. The computer 20 may be implemented with a conventional digital computer, such as a personal computer, which includes a microprocessor 21 for controlling operation of the computer 20 and executing programs. The computer 20 also includes a random access memory 22 (RAM) and read-only memory 23 (ROM). The RAM 22 can include non-volatile memories such as a hard disk drive. The computer 20 may be interfaced to a monitor 26, such as a typical monochrome or color computer monitor. An input device 24 may be used for entering information or commands into the computer 20. The input device 24 may be implemented with, for example, a keyboard, cursor control device such as "mouse," or modem connection. The computer 20 is electrically connected to a printer 27, which is a typical computer printer for printing information onto paper or other materials such as price labels. The computer 20 may also be interfaced to a mainframe computer for retrieving or storing data.

Figure 5:
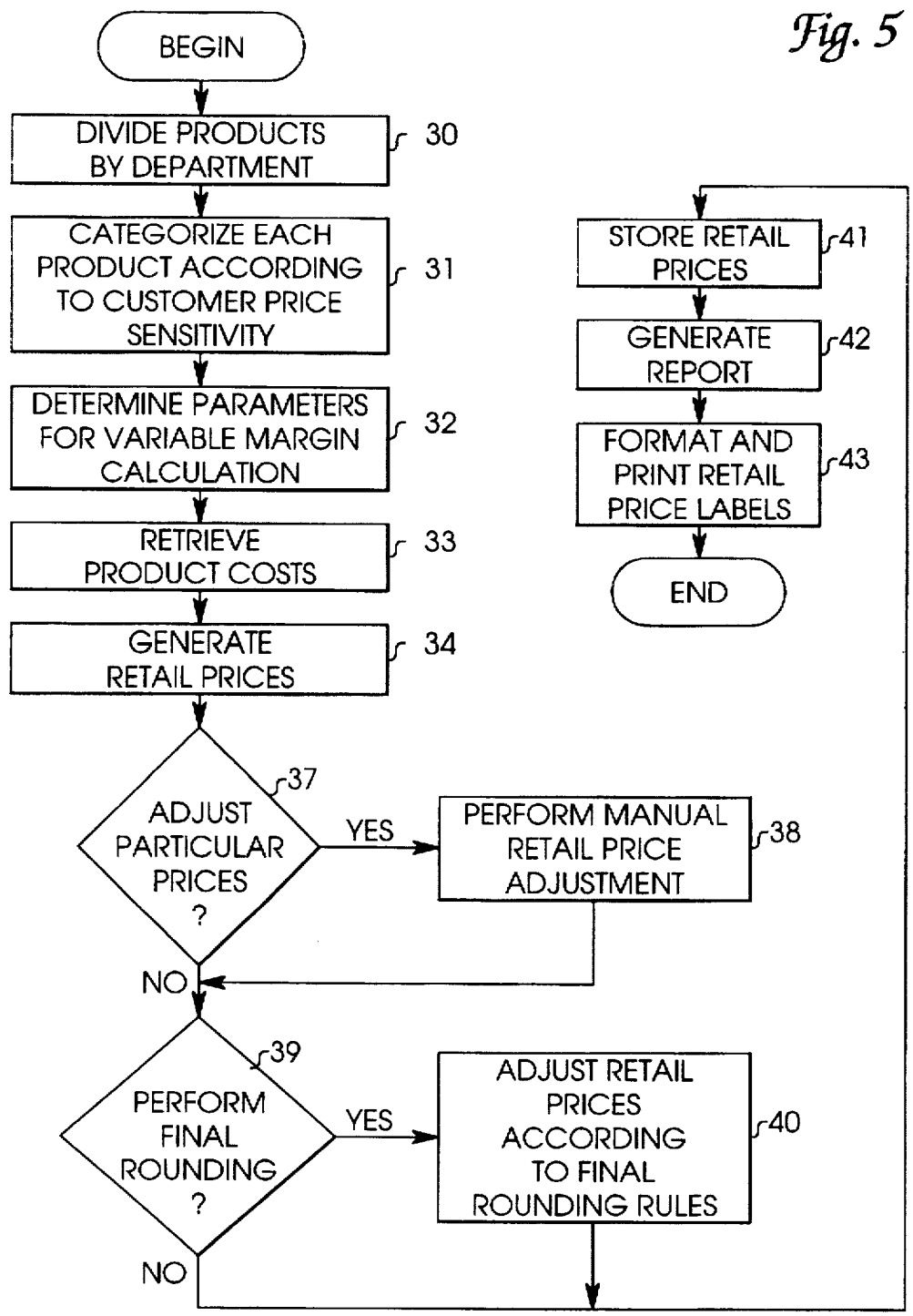
FIG. 5 is a flow chart of a process for variable margin pricing.

FIG. 5 is a flow chart of a typical process for variable margin pricing. This process may be implemented using a software program that is stored in the computer 20, such as in ROM 23 or RAM 22, and executed by the microprocessor 21. As described above, a dealer first divides products by department (30). A store may have such a small inventory, or only one product line, such that different departments are not required. A typical store, however, benefits from dividing products by department in order to provide more precise price control using the present invention.

Products or items are also categorized according to customer price sensitivity (31). This step is described above. This categorization may be accomplished by assembling a group of dealers and having them assign each product to a pool based upon their industry experience regarding customer's sensitivity to prices of particular products. Alternatively, recommended pool assignments may be provided to dealers. For example, in the case of a franchised operation, a franchiser may provide recommended pool assignments for products to the franchisees, who can then use the recommended assignments and change particular pool assignments as they see fit.

Parameters for the variable margin formulas discussed above must also be determined (32). As with the pool assignments, these parameters at least for initial price determinations may be determined by dealers or, for example, provided by a franchiser or "parent" store. Individual dealers may then fine-tune the pricing by adjusting the parameters, such as the main parameter M1C for pool C margin at $1.00 cost.

Once the pool assignments and parameters are determined, one may calculate retail prices. This may involve first retrieving product costs (33), which includes a cost for each of the products for use in a variable margin formula. Since some stores already have cost information stored within, for example, a mainframe computer, this step may involve accessing the mainframe computer 25 via modem and reading or downloading cost information. For instance, the mainframe 25 may store cost information for a chain of stores. Each of the stores may have a computer 20 which accesses the mainframe in order to download the cost information and calculate retail prices for products in that store according to the principles of the present invention. Therefore, an implementation of the present invention may include a plurality of computers 20 each having embedded software to calculate prices and each being interfaced to the mainframe 25. This also allows stores with existing cost information stored electronically to implement the present invention without having to redefine or re-enter cost information.

Based on the cost information, retail prices are generated as determined by the formulas and principles discussed above (34). For example, the computer 20 may read the cost information, calculate retail prices based on pool assignments and a variable margin formula, and then store the generated retail prices in another file for use in pricing the products.

Additional fine-tuning of the prices may be required or desired by a dealer. A dealer may desire to adjust the generated margins for particular products (37), in which case the system allows the dealer to enter a margin for any particular product (38). Finally, a dealer may desire to perform final price rounding on the generated prices so that the prices "look" more attractive to customers (39). In this case, the system performs final prices rounding rules on the generated retail prices (40). Table 3 illustrates an example of price rounding rules.

TABLE 3

| Price Range | Rounding Rule |
|---|---|
| $.00–$.25 | No rounding takes place. |
| .26–2.50 | If the last digit is less than "6" it will be rounded to a "5". If it is "6" or higher it will be rounded to a "9". (e.g. $1.74 to $1.75) |
| 2.51–9.99 | The last digit will be rounded to "9". (e.g. $3.73 to $3.79) |
| 10.00–19.99 | If the cents are between .00 and .10, $1.00 will be subtracted and the cents will be changed to .99. (e.g. $12.05 to $11.99) |
| | If the cents are between .11 and .19 it will be rounded to .19. (e.g. $12.17 to $12.19) |
| | If the cents are between .20 and .39 it will be rounded to .39. (e.g. $12.31 to $12.39) |
| | If the cents are between .40 and .59 it will be rounded to .59. (e.g. $12.47 to $12.59) |
| | If the cents are between .60 and .79 it will be rounded to .79. (e.q. $12.63 to $12.79) |
| | If the cents are between .80 and .99 it will be rounded to .99. (e.g. $12.82 to $12.99) |
| 20.00 on up | If the cents are between .00 and .10, $1.00 will be subtracted and the cents will be changed to .99. (e.g. $57.07 to $56.99) |
| | If the cents are between .11 and .29 it will be rounded to .29. (e.g. $59.19 to $59.29) |
| | If the cents are between .30 and .49 it will be rounded to .49. (e.g. $59.32 to $59.49) |
| | If the cents are between .50 and .69 it will be rounded to .69. (e.g. $59.64 to $59.69) |
| | If the cents are between .70 and .89 it will be rounded to .89. (e.g. $59.75 to $59.89) |
| | If the cents are between .90 and .99 it will be rounded to .99. (e.g. $59.94 to $59.99) |

After the price calculations (34, 38, 40), the system typically stores the final retail prices (41). The system can then access the stored retail prices in order to generate reports (42) for use in, for example, pricing products in the corresponding store or evaluating the prices. An example of such a report is shown in Appendix B.

In addition, the system may format and print the stored retail prices onto retail price labels to be affixed to the corresponding products. The computer 20, operating under software control, formats the retail price information and prints the retail prices onto labels using the printer 27. FIG. 6A is a diagram of a generic price label or ticket 45. The price label 45 includes a retail price 46 of a product and optional other information 47, which may include, for example, a product number, store number, store name, and product pool. FIG. 6B is a diagram of an example of a retail price label 48 with price ($17.40) and other information, such as the pool to which the corresponding product is assigned (pool C). These retail price labels may be affixed to a product, such as with an adhesive label or a plastic filament. Since some products, for example, contain a barcode with price information to be read by a cash register, it is not always necessary to actually attach or affix the label to the product. Therefore, these retail price labels may be alternatively located proximate a product, such on a store shelf on which the product is presented for sale.

FIG. 7 is a diagram of typical files within a computer system for use in implementing variable margin pricing described above. A margin maintenance file 50 stores information for use in generating retail prices, such as pool assignments, reference margin at $1.00 cost (such as NMC), values for parameters (such as K2) for use in a variable margin formula, and minimum and maximum margins for each pool. An example of this information and data structure is shown in the user interface of FIG. 9, described below. A margin and retail price file 51 stores cost information and generated margin and retail price information. An example of this information and data structure is shown in the report in Tables 5. The files 50 and 51 are typically electronically interrelated so that when, for example, a dealer changes a margin in file 50 the system automatically recalculates retail prices, when requested, and stores them in file 51.

FIGS. 8–11 are preferred user interfaces for a system that implements the present invention in the computer 20 according to the processing described above. FIG. 8 is a diagram of a menu user interface for allowing a user to select various sub-screens for entering or viewing information. FIG. 9 is a diagram of a margin maintenance user interface for a variable margin pricing system and corresponds to menu item "10" in FIG. 8. The user interface in FIG. 9 corresponds to file 50 and stores information used in generating retail prices for each department in a store. The margin maintenance typically includes: a margin at $1.00 for each pool (designated as a classification code in FIG. 8) for use as a reference point; a margin change coefficient for each pool (K2 value in a variable margin formula, such as the formula described above); any additional margin ("add margin") to be added to the calculated margin; and minimum and maximum margin values for each pool.

FIG. 10 is a diagram of a custom pricing retail inquiries user interface for a variable margin pricing system and corresponds to menu item "6" in FIG. 8. The user interface of FIG. 10 allows a dealer or others to view stored information such as a generated retail for a particular product along with the corresponding cost information.

FIG. 11 is a diagram of a classification code maintenance user interface for a variable margin pricing system and corresponds to menu item "2" in FIG. 8. The user interface of FIG. 11 allows a dealer or others to view and enter a classification code (pool assignment) for products. For instance, as shown in the exemplary data contained in FIG. 11, item number 520-395 in store number 789-8 is assigned to pool D.

In summary, the present invention involves a system and method for generating retail prices based on customer price sensitivity. This allows dealers more flexibility in pricing products and more direct control over margins and pricing in order to remain competitive and control gross profit. The margins are varied based on a logical relationship between margin and customer price sensitivity. The variable margin pricing system and method can also be used to generate preprinted labels to be affixed to or located proximate products.

While the present invention has been described in connection with a preferred embodiment thereof, it will be understood that many modifications will be readily apparent to those skilled in the art, and this application is intended to cover any adaptations or variations thereof. For example, different numbers of pools, or parameters for variable margin calculation, may be used without departing from the scope of the invention. It is manifestly intended that this invention be limited only by the claims and equivalents thereof.

TABLE 4

VAMPS MASTER CONTROL DOCUMENT

STORE NO. #789/8

TO ENTER VAMPS SOFTWARE

SELECT DEPT. NO. 1

M1X = ##
M1A = 0.55 *M1C
M1B = 0.85 *M1C
M1D = 1.11 *M1C
M1E = 1.22 *M1C

| Department Number | Department Name | POOL X | POOL A | | | | POOL B | | | | POOL C | | | |
|---|---|---|---|---|---|---|---|---|---|---|---|---|---|---|
| | | | M1 | k2 | ml | mh | M1 | k2 | ml | mh | M1 | k2 | ml | mh |
| 1 | Paint Sundries | 0 | 0.325 | 0.075 | 0.10 | 0.40 | 0.502 | 0.14 | 0.15 | 0.60 | 0.590 | 0.14 | 0.20 | 0.80 |
| 2 | Tools | 0 | 0.297 | 0.075 | 0.10 | 0.40 | 0.459 | 0.14 | 0.15 | 0.60 | 0.540 | 0.14 | 0.20 | 0.80 |
| 3 | Electrical | 0 | 0.303 | 0.075 | 0.10 | 0.40 | 0.468 | 0.14 | 0.15 | 0.50 | 0.550 | 0.14 | 0.20 | 0.80 |
| 4 | Builders | 0 | 0.330 | 0.075 | 0.10 | 0.40 | 0.510 | 0.14 | 0.15 | 0.60 | 0.600 | 0.14 | 0.20 | 0.80 |
| 5 | Sporting goods | 0 | 0.275 | 0.075 | 0.10 | 0.40 | 0.425 | 0.14 | 0.15 | 0.60 | 0.500 | 0.14 | 0.20 | 0.80 |
| 6 | Housewares | 0 | 0.275 | 0.075 | 0.10 | 0.40 | 0.425 | 0.14 | 0.15 | 0.60 | 0.500 | 0.14 | 0.20 | 0.80 |
| 7 | Rural | 0 | 0.286 | 0.075 | 0.10 | 0.40 | 0.442 | 0.14 | 0.15 | 0.60 | 0.520 | 0.14 | 0.20 | 0.80 |
| 8 | Plumbing | 0 | 0.319 | 0.075 | 0.10 | 0.40 | 0.493 | 0.14 | 0.15 | 0.60 | 0.580 | 0.14 | 0.20 | 0.80 |
| 9 | Lawn & Garden | 0.05 | 0.286 | 0.075 | 0.10 | 0.40 | 0.442 | 0.14 | 0.15 | 0.60 | 0.520 | 0.14 | 0.20 | 0.80 |
| 10 | Automotive | 0 | 0.303 | 0.075 | 0.10 | 0.40 | 0.468 | 0.14 | 0.15 | 0.60 | 0.550 | 0.14 | 0.20 | 0.80 |
| 11 | Store Supplies | 0 | 0.303 | 0.075 | 0.10 | 0.40 | 0.468 | 0.14 | 0.15 | 0.60 | 0.550 | 0.14 | 0.20 | 0.80 |
| 12 | Paint | 0 | 0.275 | 0.075 | 0.10 | 0.40 | 0.425 | 0.14 | 0.15 | 0.60 | 0.500 | 0.14 | 0.20 | 0.80 |
| 13 | Toys | 0 | 0.275 | 0.075 | 0.10 | 0.40 | 0.425 | 0.14 | 0.15 | 0.60 | 0.500 | 0.14 | 0.20 | 0.80 |
| Currently Selected Coefficients | Paint Sundries | 0.000 | 0.325 | 0.075 | 0.10 | 0.40 | 0.502 | 0.14 | 0.15 | 0.60 | 0.590 | 0.14 | 0.20 | 0.80 |

| Department Number | Department Name | POOL D | | | | POOL E | | | |
|---|---|---|---|---|---|---|---|---|---|
| | | M1 | k2 | ml | mh | M1 | k2 | ml | mh |
| 1 | Paint Sundries | 0.655 | 0.14 | 0.35 | 0.85 | 0.720 | 0.14 | 0.45 | 0.90 |
| 2 | Tools | 0.599 | 0.14 | 0.35 | 0.85 | 0.659 | 0.14 | 0.45 | 0.90 |
| 3 | Electrical | 0.611 | 0.14 | 0.35 | 0.85 | 0.671 | 0.14 | 0.45 | 0.90 |
| 4 | Builders | 0.666 | 0.14 | 0.35 | 0.80 | 0.732 | 0.14 | 0.45 | 0.90 |
| 5 | Sporting goods | 0.555 | 0.14 | 0.35 | 0.85 | 0.610 | 0.14 | 0.45 | 0.90 |
| 6 | Housewares | 0.555 | 0.14 | 0.35 | 0.85 | 0.610 | 0.14 | 0.45 | 0.90 |
| 7 | Rural | 0.577 | 0.14 | 0.35 | 0.85 | 0.634 | 0.14 | 0.45 | 0.90 |
| 8 | Plumbing | 0.644 | 0.14 | 0.35 | 0.85 | 0.708 | 0.14 | 0.45 | 0.90 |
| 9 | Lawn & Garden | 0.577 | 0.14 | 0.35 | 0.85 | 0.634 | 0.14 | 0.45 | 0.90 |
| 10 | Automotive | 0.611 | 0.14 | 0.35 | 0.85 | 0.671 | 0.14 | 0.45 | 0.90 |
| 11 | Store Supplies | 0.611 | 0.14 | 0.35 | 0.85 | 0.671 | 0.14 | 0.45 | 0.90 |
| 12 | Paint | 0.555 | 0.14 | 0.35 | 0.85 | 0.610 | 0.14 | 0.45 | 0.90 |
| 13 | Toys | 0.555 | 0.14 | 0.35 | 0.85 | 0.610 | 0.14 | 0.45 | 0.90 |
| Currently Selected Coefficients | Paint Sundries | 0.655 | 0.14 | 0.35 | 0.85 | 0.720 | 0.14 | 0.45 | 0.90 |

INDICATES DEPARTMENTS CURRENTLY ON LINE AT 789/8

POOL X MARGIN IS A CONSTANT VALUE SELECTED BY DEALER WITH A RANGE OF PLUS OR MINUS 0.10.

TABLE 5

RETAIL PRICING REPORT

| ITEM NUMBER | DESCRIPTION | CLASS | POOL | QTY | LANDED COST | EXTENDED LANDED COST | DEALER COST | EXTENDED DEALER RETAIL | MARGIN | CALCULATED RETAIL | EXTENDED CALC RETAIL | MARGIN |
|---|---|---|---|---|---|---|---|---|---|---|---|---|
| 277-327 | TMPR MNI GLU GUN (LT-160) | 23810 | A | 13 | 2.60 | 33.80 | 3.57 | 46.41 | .27 | 3.57 | 46.41 | .27 |
| 802-090 | NAIL SET PACK | 20900 | A | 8 | 3.14 | 25.12 | 4.27 | 34.16 | .26 | 4.27 | 34.16 | .26 |
| 287-433 | RED MINI BIN SET 08-210 | 23000 | A |  | 3.61 | .00 | 4.88 | .00 | .26 | 4.88 | .00 | .26 |
| 694-125 | 1INX25FT WARNER TAPE MEASUR | 22320 | A | 12 | 4.12 | 49.44 | 5.54 | 66.48 | .26 | 5.54 | 66.48 | .26 |
| 108-373 | 16OZ CLAW HAMMER | 20010 | A | 50 | 4.32 | 216.00 | 5.80 | 290.00 | .26 | 5.80 | 290.00 | .26 |
| 110-114 | TRIG FED HOT GLUE GUN (208) | 23810 | A | 16 | 4.59 | 73.44 | 6.15 | 98.40 | .25 | 6.15 | 98.40 | .25 |
| ⋮ |  |  |  |  |  |  |  |  |  |  |  |  |
| 465-146 | VAR SPEED MOTO-TOOL KIT | 24510 | A | 10 | 76.66 | 766.60 | 92.15 | 921.50 | .17 | 92.15 | 921.50 | .17 |
| 352-617 | 10IN MITER SAW | 24850 | A | 1 | 155.56 | 155.56 | 182.28 | 182.28 | .15 | 182.28 | 182.28 | .15 |
| 883-611 | 10IN CONTRACTORS SAW | 24800 | A |  | 548.60 | .00 | 615.19 | .00 | .11 | 615.19 | .00 | .11 |
| 006-684 | PLASTIC BOX-6 COMPARTMENTS | 23000 | B | 11 | .51 | 5.61 | 1.02 | 11.22 | .50 | 1.02 | 11.22 | .50 |
| 110-585 | REPLACEMENT BLADES | 20710 | B | 110 | .55 | 60.50 | 1.09 | 119.90 | .50 | 1.09 | 119.90 | .50 |
| 742-288 | STEEL LOOPHAMMER HOLDER | 22600 | B | 2 | .74 | 1.48 | 1.42 | 2.84 | .48 | 1.42 | 2.84 | .48 |
| ⋮ |  |  |  |  |  |  |  |  |  |  |  |  |
| 566-067 | TSC SAWZALL KIT W/CS (6507) | 24650 | B | 1 | 145.58 | 145.58 | 172.73 | 172.73 | .16 | 172.73 | 172.73 | .16 |
| 521-286 | ⅜" HI TORQ DRIV DRL (-1) | 24600 | B | 1 | 153.86 | 153.86 | 181.83 | 181.83 | .15 | 181.83 | 181.83 | .15 |
| 336-636 | SUP SAWZAL W/QU-LOK (6527) | 24650 | B |  | 176.46 | .00 | 206.50 | .00 | .15 | 206.50 | .00 | .15 |
| 001-040 | STAKE FLAG GLO-ORANGE | 22500 | C |  | .04 | .00 | .15 | .00 | .73 | .15 | .00 | .73 |
| 988-006 | ½ HEX WRENCH (732SB) | 23600 | C |  | .11 | .00 | .34 | .00 | .68 | .34 | .00 | .68 |
| 153-973 | V-NOTCHED SPREADER | 22710 | C | 12 | .25 | 3.00 | .67 | 8.04 | .63 | .67 | 8.04 | .63 |
| ⋮ |  |  |  |  |  |  |  |  |  |  |  |  |
| 120-931 | 16 PC ½ IN DR SOCKET SET | 23410 | C |  | 81.16 | .00 | 111.59 | .00 | .27 | 111.59 | .00 | .27 |
| 327-957 | 26IN-5 DRAWER TOOL CHEST | 23000 | C |  | 93.70 | .00 | 127.30 | .00 | .26 | 127.30 | .00 | .26 |
| 327-882 | TOOL STORAGE CENTER | 23000 | C |  | 99.49 | .00 | 134.50 | .00 | .26 | 134.50 | .00 | .26 |
| 749-978 | 14PC COMB WRENCH SET | 23310 | C |  | 101.39 | .00 | 136.86 | .00 | .26 | 136.86 | .00 | .26 |
| 883-645 | 4IN BELT 6IN DISC SANDER | 24750 | C | 1 | 114.71 | 114.71 | 153.29 | 153.29 | .25 | 153.29 | 153.29 | .25 |
| 011-940 | SOAPSTONE REFILL | 22500 | D | 2 | .09 | .18 | .35 | .70 | .74 | .35 | .70 | .74 |
| 121-970 | ¼ HX KY WRENCH (14SB) | 23600 | D | 4 | .19 | .76 | .64 | 2.56 | .70 | .64 | 2.56 | .70 |
| 121-988 | ⁵⁄₁₆IN HX KY WRENCH (516SB) | 23600 | D | 27 | .25 | 6.75 | .79 | 21.33 | .68 | .79 | 21.33 | .68 |
| 929-943 | METAL WEDGE ⁵⁄₁₆X½X1 ⅛ | 20040 | D | 12 | .27 | 3.24 | .84 | 10.08 | .68 | .84 | 10.08 | .68 |
| ⋮ |  |  |  |  |  |  |  |  |  |  |  |  |
| 550-012 | XTRA-DUTY V-BELT ⅜X50 | 25510 | D |  | 4.91 | .00 | 9.88 | .00 | .50 | 9.88 | .00 | .50 |
| 225-821 | DRIVE PINS 2 ½ IN LONG | 24410 | D |  | 5.80 | .00 | 11.44 | .00 | .49 | 11.44 | .00 | .49 |
| 513-762 | RIP FENCE/CIRCULAR SAWS | 24990 | D |  | 6.17 | .00 | 12.08 | .00 | .49 | 12.08 | .00 | .49 |
| 595-322 | ROUTER GUIDE | 24990 | D |  | 8.72 | .00 | 16.40 | .00 | .47 | 16.40 | .00 | .47 |
| 852-160 | FLEX HANDLE REP KIT ½ DR | 23420 | F | 4 | .00 | .00 | .00 | .00 | .00 | .00 | .00 | .00 |

TABLE 5-continued

RETAIL PRICING REPORT

| ITEM NUMBER | DESCRIPTION | CLASS | POOL | QTY | LANDED COST | EXTENDED LANDED COST | DEALER COST | EXTENDED DEALER RETAIL | MARGIN | CALCULATED RETAIL | EXTENDED CALC RETAIL | MARGIN |
|---|---|---|---|---|---|---|---|---|---|---|---|---|
| 274-233 | 50PC COMB WRENCH DISPLAY | 23310 | F | | 57.21 | .00 | 99.69 | .00 | .43 | .00 | .00 | .00 |
| 065-706 | 6IN COMB SLIP JOINT PLIERS | 21310 | X | 30 | .83 | 24.90 | .83 | 24.90 | .00 | .83 | 24.90 | .00 |
| 122-382 | BERNZ O MATIC REFILL | 23720 | X | 192 | 2.38 | 456.96 | 2.38 | 456.96 | .00 | 2.38 | 456.96 | .00 |

| | | NUMBER OF ITEMS | MARGINS |
|---|---|---|---|
| POOL TOTALS: | A | 40 | 30% |
| | B | 107 | 46% |
| | C | 1562 | 54% |
| | D | 220 | 60% |
| | E | 2 | % |
| | F | 7 | % |

What is claimed is:

1. A method implemented by a computer for generating retail prices for products using variable margins based on customer price sensitivity for the corresponding products, comprising the steps of:

electronically dividing a group of products into a series of pools ranging from a first pool in the series for products having a highest price sensitivity to a last pool in the series for products having a lowest price sensitivity;

receiving electronic product cost information including a cost for each of the products; and electronically generating from the cost information retail prices for the products, comprising assigning a first retail price margin to each of the pools, the first retail price margins decreasing from the first pool to the last pool, and assigning varying retail price margins to the products in each of the pools, the varying retail price margins decreasing from the first retail price margin as the product costs increase within each of the pools.

2. The method of claim 1 wherein the generating step comprises the step of assigning the margins based on a logarithmic relationship between retail price and cost.

3. The method of claim 1 wherein the generating step comprises the step of calculating the retail prices using the formula: retail price=cost/((1−M1)+K2log(cost)), wherein M1 is a predetermined margin at a particular cost and K2 is a predetermined constant value.

4. The method of claim 1 wherein the generating step comprises the step of altering the generated retail prices according to predetermined final price rounding rules.

5. The method of claim 1, further comprising the step of allowing a user to manually alter one or more of the generated retail prices.

6. The method of claim 1 wherein the method is used to generate the retail prices for hardware products.

7. The method of claim 1, further comprising the step of interrelating the pools based on predefined criteria.

* * * * *